Patented Feb. 2, 1937

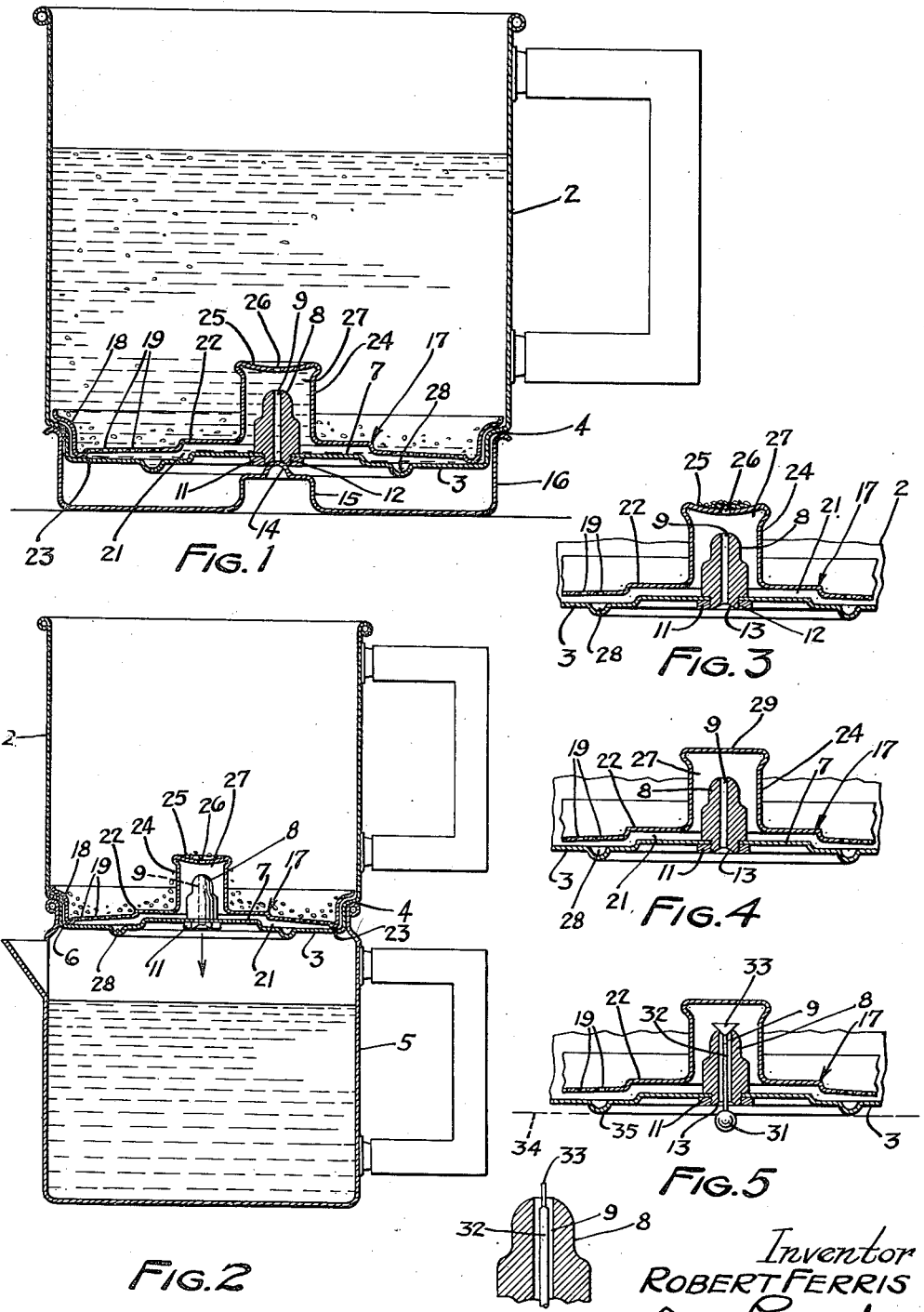

2,069,229

UNITED STATES PATENT OFFICE 2,069,229

COFFEE MAKING APPARATUS

Robert Ferris, Minneapolis, Minn.

Application June 29, 1936, Serial No. 87,970

6 Claims. (Cl. 53—3)

This invention relates to new and useful improvements in coffee making apparatus, and more particularly to such apparatus of the general character disclosed in my Patent No. 1,962,493.

An object of the present invention is to provide an apparatus of the class described which is extremely simple and inexpensive in construction, is simple to operate, and presents the utmost in efficiency.

A further object is to provide a coffee making apparatus comprising a container provided in its bottom with a discharge opening, and having a perforated disk removably supported in the lower portion of the container for filtering the liquid as it is drained from the container through said opening, and means being provided for closing said opening to prevent the liquid from draining from the container, whereby the liquid may be temporarily retained therein to allow it to steep before it is drained from the container.

A further object is to provide a coffee making apparatus comprising a container provided in its bottom with a raised portion having a discharge opening therein, whereby said discharge opening is disposed above the level of the bottom of the container, and means being provided for temporarily closing said opening whereby the beverage may be allowed to steep in the container any desired length of time before the liquid is drained therefrom.

A further object is to provide a container having a bottom wall provided with a raised portion having a discharge opening therein, the intake of which is disposed above the level of the bottom wall, and a member being removably supported in the container and cooperating with said raised portion to provide a siphon for draining substantially all of the liquid from the container when the discharge is opened.

A further object is to provide a coffee making apparatus comprising a container having a discharge opening in the bottom wall thereof, and an auxiliary member providing a support for the container and having means for closing the discharge opening, when the container is supported thereon.

Other objects of the invention will appear from the following description and accompanying drawing and will be pointed out in the annexed claims.

In the accompanying drawing there has been disclosed a structure designed to carry out the various objects of the invention, but it is to be understood that the invention is not confined to the exact features shown as various changes may be made within the scope of the claims which follow.

In the drawing:

Figure 1 is a vertical sectional view showing a container having the invention embodied therein, and the container being shown seated upon the auxiliary support, whereby the discharge opening thereof is closed;

Figure 2 is a vertical sectional view of my improved coffee making apparatus showing the container supported on a conventional dispensing receptacle, and the liquid or coffee transferred into the lower receptacle;

Figure 3 is a detail sectional view illustrating the siphoning means, and also showing the air vent provided in the upper raised portion of the filtering member sealed by coffee grounds;

Figure 4 is a detail sectional view similar to Figure 3, but showing a modified construction;

Figure 5 is a detail sectional view showing a valve means embodied in the construction of the lower portion of the container; and Figure 6 is an enlarged detail sectional view of the raised portion of the container bottom, shown in Figure 5.

In the selected embodiment of the invention here shown, there is illustrated in Figure 2, for purposes of disclosure, a coffee making apparatus comprising an upper container 2 having a bottom wall 3 provided with an annular seat 4 adapted to be seated upon the upper edge of a suitable dispensing receptacle or coffee pot 5. The lower portion 6 of the container is slightly reduced in diameter so as to fit into the upper open end or mouth of the receptacle 5, and whereby the diameter of the container 2 may be made substantially the same as the diameter of the receptacle 5.

An important feature of the present invention resides in the means provided for temporarily retaining the liquid in the receptacle 2 during the brewing or steeping operation. In the preferred form, shown in Figures 1, 2, and 3, the bottom wall 3 of the container is preferably provided with a raised portion 7, to which is secured an upstanding nipple 8 having a discharge opening 9 extending lengthwise therethrough. The nipple 8 is shown secured to the bottom wall 3 of the container by a suitable nut 11, received in threaded engagement with the reduced portion 12 thereof.

The lower end of the nipple 8 is shown provided with a beveled valve seat 13 adapted to be engaged by a projection 14 provided upon the raised portion 15 of an auxiliary supporting member 16. The member 16 is adapted to temporarily support the container 2 during the brewing operation. When it is desired to prolong the steeping or brewing operation, the container 2 is seated upon the auxiliary supporting member 16, whereby the discharge opening 9 is closed as a result of the projection 14 engaging the valve seat 13, as will be clearly understood by reference to Figure 1. The projection 14 is so disposed with respect to the annular seat 4, provided in the lower portion of the container, that when the latter is supported on the member 16, as shown in Figure 1, substantially the entire weight of the container and its contents will be supported on the projection 14, thereby insuring a leak-proof connection between the projection 14 and the valve seat 13.

A perforated disk or filtering member, generally indicated by the numeral 17, is removably fitted into the container 2, and is shown having an annular upstanding flange 18. The disk 17 is provided at its outer portion with suitable perforations 19, through which the liquid filters from the container into the space 21, provided between the bottom wall 3 of the container and the bottom wall 22 of the filtering member 17. The bottom wall of the filtering member is preferably provided adjacent its outer edge with a suitable bead 23 which acts to space its bottom wall 22 from the bottom wall 3 of the container.

The filtering member 17 has a raised central portion 24, the top wall 25 of which is preferably concaved, as shown in Figures 1, 2, and 3. An air vent 26 is provided in the wall 25 to permit trapped air to escape from the chamber 27, provided between the periphery of the nipple 8 and the wall of the raised portion 24 of the filtering member, when liquid is poured into the container 2.

In the operation of the apparatus, as shown in Figures 1 and 3, inclusive, the disk 17 is placed in the container, and the latter seated upon the auxiliary supporting member 16. A measured quantity of ground coffee is then deposited on top of the disk 17 in the container 2. Boiling water is then poured into the container, and a cover, not shown, placed thereon. Because of the container being seated on the auxiliary supporting member 16, the discharge opening 9 in the bottom of the container is closed, so that the liquid is temporarily retained in the container, thereby permitting the coffee to steep therein. When the steeping or brewing operation has been completed, the container is lifted from the auxiliary support 16 and placed on the receptacle 5, as shown in Figure 2, whereupon the discharge opening 9 is opened to permit the liquid to drain from the container 2 into the receptacle 5, as illustrated in Figure 2.

When it is desired to transfer the coffee from the container 2 into the receptacle 5, the coffee draining from the container while moving it from the supporting member 16 to the receptacle, will be caught in the member 16, as the receptacle is desirably positioned alongside of the receptacle, before placing the container thereon. The discharge opening 9 may be of any desired size, depending upon whether it is desired to drain the contents from the container quickly, or relatively slower.

Another feature of the invention resides in the particular construction and arrangement of the nipple 8 and raised central portion 24 of the filtering member 17, which is such that they cooperate to provide a siphon, whereby substantially all of the liquid is drained from the container 2 into the receptacle 5, regardless of the fact that the intake of the discharge opening 9 is disposed at a level considerably above the level of the bottom wall 3 of the container. When the discharge 9 is opened by removing the container from the supporting member 16, the liquid will commence to flow by gravity from the container through the discharge 9. When the level of the liquid in the container drops below the top wall 25 of the disk 17, the siphon action is started as a result of the liquid flowing through the discharge opening 9, which tends to create a vacuum in the upper portion of the chamber 27, whereby substantially all of the liquid in the container is drained from the container into the receptacle.

The air vent 26 in the wall 25 of the filtering member serves to provide an air vent for the escape of air trapped in the chamber 27, when water is suddenly poured into the container, whereby the filtering member will not be unseated as a result of air pressure in the chamber 27.

In the operation of transferring the liquid from the container to the receptacle, it is essential, in order to obtain a siphon action, that the apparatus be so constructed that the air vent 26 is substantially closed, when the level of the liquid in the container recedes below the top wall 25 of the filtering member. Otherwise, air would be drawn therethrough into the chamber 27 and thus prevent the formation of a siphon. To thus close the air vent 26, the upper wall 25 of the central portion 24 of the filtering member is concaved, as shown in Figures 1, 2, and 3, whereby a portion of the wet coffee grounds will accumulate thereon and substantially seal the air vent 26 so that the siphon may function.

An annular groove or depression 28 is preferably provided in the bottom wall 3 of the container adapted to trap any sludge or fine sediment which may pass through the perforations 19 in the disk or filtering member 17, thereby to prevent such sludge and sediment from being transferred into the receptacle 5 with the liquid. Also, because of the intake of the discharge 9 being disposed considerably above the bottom wall 3 of the container, the liquid lastly draining from the container must flow upwardly, which further tends to prevent the sludge from being transferred into the pot or receptacle 5. Thus, the liquid transferred into the receptacle will be sparkling clear and free from all sludge and sediment.

Figure 4 illustrates a construction wherein the air vent 26, shown in Figures 1 to 3, has been eliminated. As here shown, the raised portion 24 of the filtering member 17 is shown provided with a horizontally disposed top wall 29 which is imperforate, whereby air or liquid cannot escape therethrough. The apparatus operates in substantially the same manner as the form shown in Figures 1 to 3, with the exception that it is not dependent upon a portion of the coffee grounds being deposited on the wall 29 to render the siphon action operable.

Figures 5 and 6 illustrate a construction wherein a separate valve 31 is provided for closing the discharge opening 9 in the nipple 8. This valve is shown having a stem 32 received in the discharge opening 9 and provided at its upper end with a flat head 33, for preventing the valve from becoming separated from the nipple 8, as will readily be understood by reference to Figure 5.

In the form shown in Figures 5 and 6, the valve 31 is preferably so arranged that when the container is placed upon a suitable support, indicated by the dotted lines 34 in Figure 5, the valve 31 will be forced into engagement with the seat 13 because of the lowermost portion thereof, when the valve is closed, projecting slightly below the lowermost portion 35 of the container, whereby the weight of the container and its contents will retain the valve 31 in closed position to positively prevent leakage of the liquid from the container. The apparatus, shown in Figure 5, operates in substantially the same manner as that shown in Figures 1 to 3, in that when the container is lifted off the support 34, gravity will open the valve and permit the contents to discharge from the container through the discharge opening 9 in the nipple 8.

The novel coffee making apparatus, herein disclosed, is extremely simple and inexpensive in construction and comprises few parts. The filtering member 17 is loosely supported in the bottom of the container 2 and may readily be removed therefrom by grasping the raised central portion 24 thereof, which acts as a finger grip. When the liquid has been transferred from the container into the receptacle 5, the coffee grounds will be deposited upon the filtering member 17, as best shown in Figure 2, whereby it may readily be removed from the container by simply lifting the filtering member therefrom.

The container comprises no movable parts. The only detachable part resides in the filtering member 17 which, as best illustrated in Figure 1, is loosely received in the container, and is so constructed that it cannot be incorrectly placed therein, if dropped into the container in an upright position. Thus, the apparatus may readily and conveniently be cleaned by simply removing the filtering member 17 from the container, whereby the entire inner surface of the container is accessible, and may be conveniently cleaned. This is an important factor in devices of this general character, for sanitary reasons.

The auxiliary supporting member 16 is also very simple in construction and, as best illustrated in Figure 1, is preferably integrally formed from a single piece of sheet metal. The projection 14 of the supporting member 16 serves as a valve for closing the discharge opening 9 in the container 2. The supporting member is used only when it is desired to allow the liquid to remain in the container to prolong the operation of brewing or steeping the beverage. In some cases, it may be desirable to make the discharge opening 9 of such size, that when a predetermined quantity of liquid is poured into the container 2, and has drained therefrom into the receptacle 5, the beverage will have completed its brewing or steeping operation. When thus used, the container 2 is preferably placed directly upon the receptacle 5, and boiling water introduced therein. When thus used, the transferring of the liquid from the container into the receptacle will commence immediately upon the deliver of water into the container.

The auxiliary supporting member 16 provides means whereby the operation of brewing or steeping the beverage may be controlled at will, as the liquid cannot drain from the container while the latter is supported on the member 16, as shown in Figure 1. To drain the liquid from the container, the latter is removed from the supporting member 16 and placed over a suitable receiving means, such as the receptacle 5. Because of the intake of the discharge opening 9 being disposed above the level of the bottom wall of the container, causing the liquid to flow upwardly, no sediment or sludge passing through the perforation 19 of the filtering member 17 is delivered into the receptacle 5, as such foreign matter will accumulate on the bottom wall 3 of the container. As a result, the beverage which is thus transferred into the receptacle 5 from the container 2, will be very clear and sparkling, which is a very desirable feature in apparatus of this general character.

While I have herein referred to the apparatus as a "coffee making apparatus", it is to be understood that it may be used with equal success for making tea, and other beverages or liquids which are brewed by the steeping process.

By the term "normal liquid level", as used in the claims for defining the height of the discharge opening above the bottom wall of the container, is meant any level of liquid in the container which is between minimum and maximum capacity of the apparatus for making an infusion. Thus, even when making a single cup of coffee, tea, etc., the discharge opening will be below the liquid level in the container.

I claim as my invention:

1. In an apparatus of the class described, a container having a bottom wall provided with an upwardly projecting member having a discharge opening extending longitudinally therethrough, a filtering member loosely supported in the container and having a raised portion fitting over and enclosing said upwardly projecting member with its walls spaced from the corresponding walls thereof, the upper wall of said hood portion being concaved and having an air vent therein, said air vent being adapted to be sealed by the solids and liquids resting in said concave portion, said hood cooperating with said upwardly projecting member to form a siphon, whereby substantially all of the liquid in the container may be drained therefrom through said discharge opening.

2. In an apparatus of the class described, a container having a bottom wall provided with an upwardly projecting member having a discharge opening extending longitudinally therethrough, a filtering member loosely supported in the container and having a hood portion fitting over said upwardly projecting member with its walls spaced from the corresponding walls thereof, the upper wall of said hood portion being concaved and having an air vent therein, said hood portion cooperating with said upwardly projecting member to provide a siphon, whereby substantially all of the liquid in the container may be drained therefrom through said discharge opening, and said concaved wall being adapted to receive a portion of the coffee grounds and liquids when the liquid is draining from the container, whereby the moist coffee grounds may close and seal the air vent to cause the siphon to operate and drain the liquid from the container.

3. In an apparatus of the class described, an infusion device including a container having a bottom wall provided with an upstanding projection formed with a bore defining a discharge opening through which the contents of the receptacle may be drained therefrom, and an independent auxiliary supporting member adapted to receive and support the container, said supporting member having a projection adapted to engage and close said discharge opening when the container is seated on the supporting member, and a filtering member removably supported in the container, said filtering member having a hood adapted to enclose said upstanding projection and cooperate therewith to form a siphon for the container.

4. In an apparatus of the class described, an infusion device including a container having a bottom wall provided with an upstanding projection formed with a bore defining a discharge opening, whereby the contents of the container may be drained therefrom, the intake of said discharge opening being disposed at an elevation above said bottom wall, an independent auxiliary supporting member having a projection adapted to engage and close said discharge opening when the container is seated on the supporting member, and a filtering member fitting in the container and having means adapted to cooperate with the upstanding projection in the container to form a siphon for draining the liquid contents of the container therefrom, when the container is removed from the supporting member.

5. In an apparatus of the class described, an infusion device including a substantially cylindrical container having a bottom and side walls, said bottom wall having a raised central portion defining a circumferential sediment well between said central portion and the side wall, said central portion having an upstanding projection formed with a bore defining a discharge opening for said container, the top of said projection and bore terminating below the normal liquid level in said container so as to be submerged at all times between minimum and maximum capacity of the apparatus, and a filter member adapted to fit into said container, said filter member having a perforated bottom wall adapted to lie in relatively close but spaced relation to the bottom wall of said container, said filter member having an upstanding hood adapted to enclose said upstanding projection and cooperate therewith to form a siphon which lies below the normal minimum liquid level in said container.

6. In an apparatus of the class described, an infusion device including a substantially cylindrical container having a bottom and side walls, said bottom wall having an upstanding projection defining a circumferential sediment well between said projection and the side walls, said projection being formed with a bore defining a discharge opening for said container, the top of said projection and bore terminating below the normal liquid level in said container so as to be submerged at all times between minimum and maximum capacity of the apparatus, and a filter member adapted to fit into said container, said filter member having a perforated bottom wall adapted to lie in relatively close but spaced relation to the bottom wall of said container, said filter member having an upstanding hood adapted to enclose said upstanding projection and cooperate therewith to form a siphon which lies below the normal minimum liquid level in said container.

ROBERT FERRIS.